Oct. 11, 1932.    R. N. HEALD ET AL    1,881,553
GRINDING MACHINE
Original Filed Jan. 24, 1925    6 Sheets-Sheet 1

Inventor
Roger N. Heald
Waldo J. Guild
Alfred P. Burns
George E. Garno
By Geo. W. Kennedy Jr.
Attorney Oct. 11, 1932.     R. N. HEALD ET AL     1,881,553
GRINDING MACHINE
Original Filed Jan. 24, 1925     6 Sheets-Sheet 2

Inventor
Roger N. Heald
Waldo J. Guild
Alfred P. Burns
George E. Garno
By
Attorney Inventor
Roger N. Heald
Waldo J. Guild
Alfred P. Burns
George E. Garno

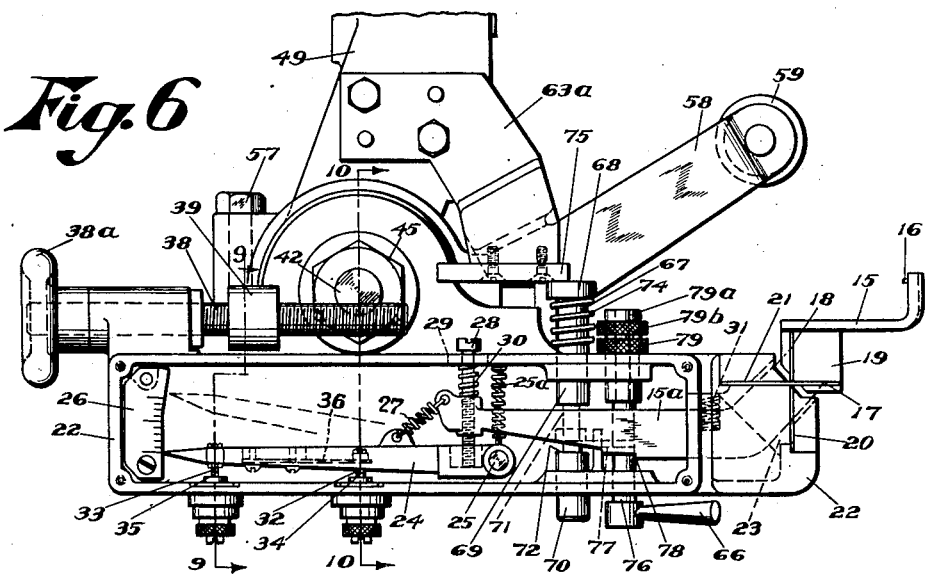
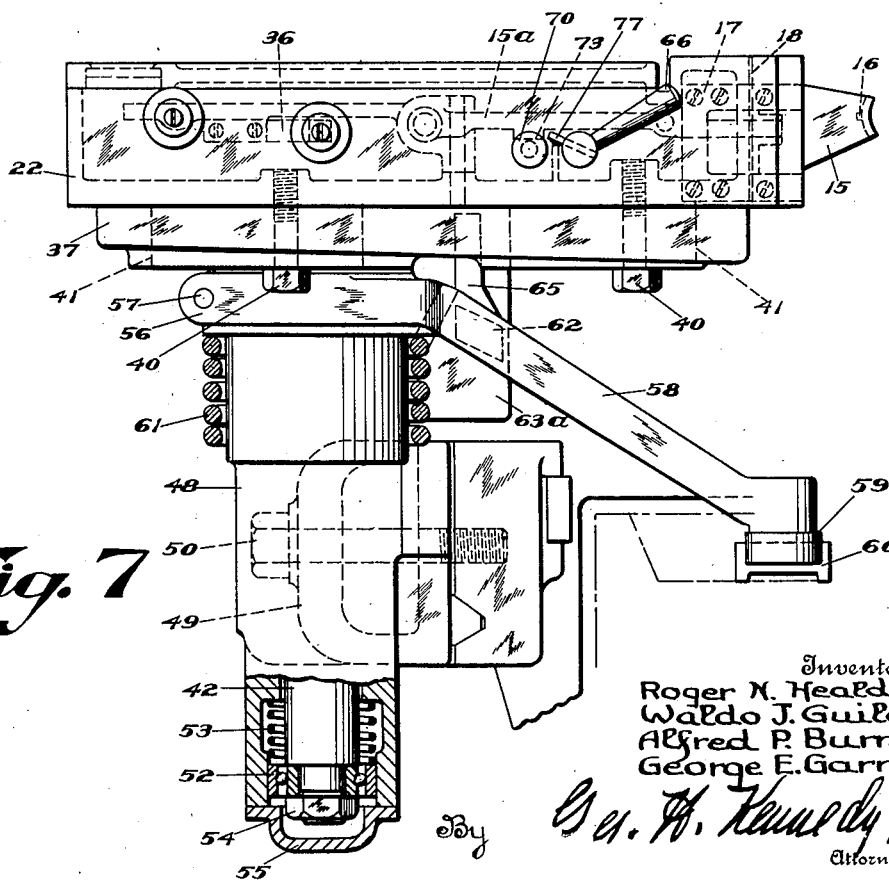

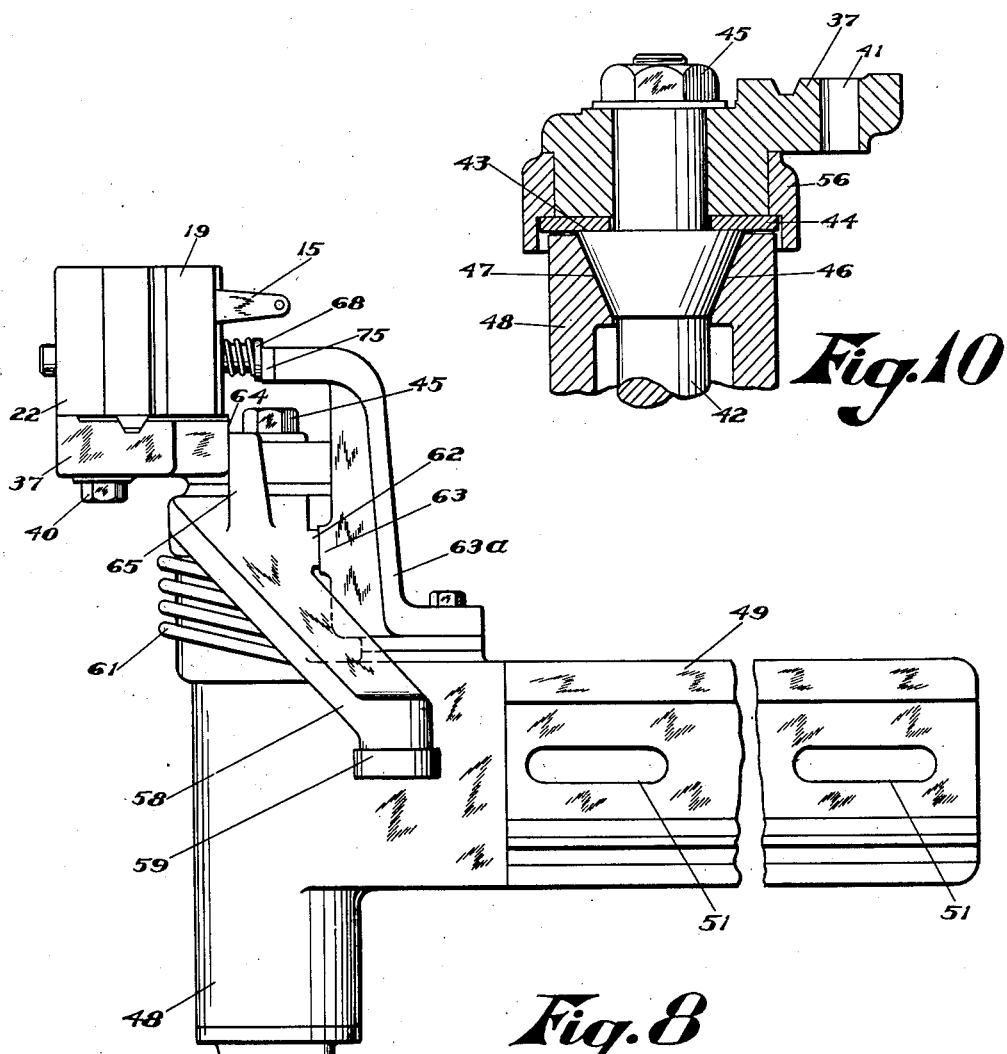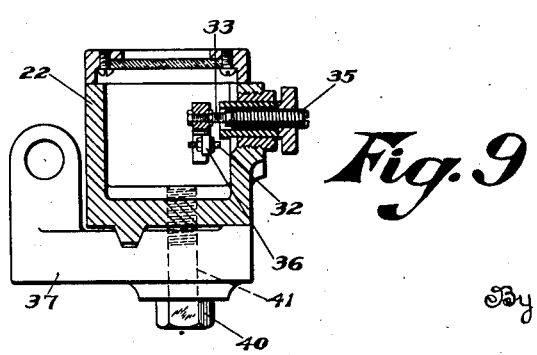

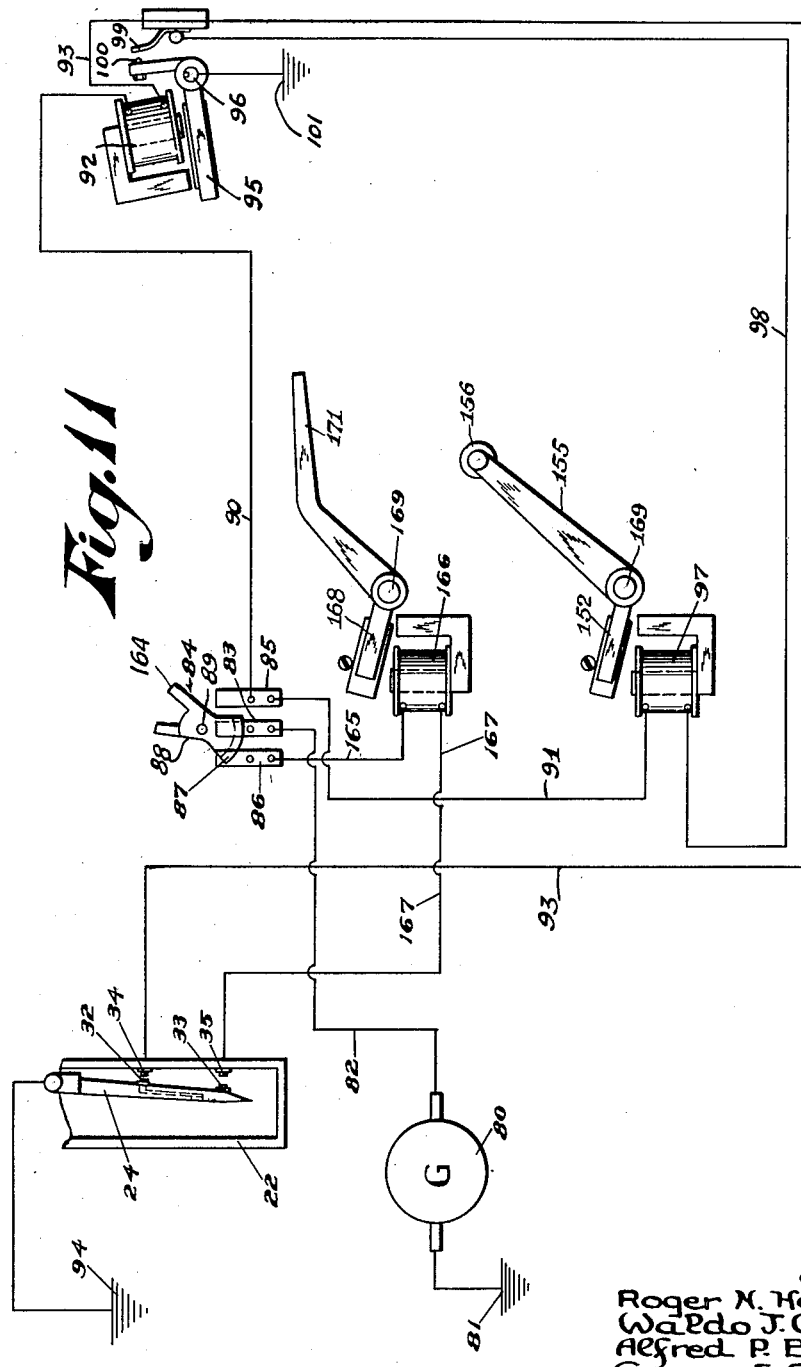

Patented Oct. 11, 1932

1,881,553

UNITED STATES PATENT OFFICE

ROGER N. HEALD, WALDO J. GUILD, ALFRED P. BURNS, AND GEORGE E. GARNO, OF WORCESTER, MASSACHUSETTS, ASSIGNORS TO THE HEALD MACHINE COMPANY, OF WORCESTER, MASSACHUSETTS, A CORPORATION OF MASSACHUSETTS

GRINDING MACHINE

Original application filed January 24, 1925, Serial No. 4,466. Divided and this application filed April 13, 1927. Serial No. 183,504.

This invention relates to grinding machines,—the present application being a division of parent application Serial No. 4,466, filed January 24, 1925, and issued as United States Letters Patent No. 1,751,202, dated March 18, 1930. The latter relates to an automatic grinding machine provided with a work contacting calipering or gauging mechanism and means set in operation thereby to cause the grinding wheel to be dressed and trued at a certain stage in the grinding operation, and means also set in operation by the calipering mechanism to terminate the grinding when the workpiece reaches the exact desired size. The present invention relates to the calipering mechanism of and by itself, including the instrumentalities for causing it to swing into and out of the workpiece at the commencement and termination respectively, of the grinding operation.

The machine of our invention is adapted for the rapid production of articles such as sleeves, gears, bushings, ball races and the like, whose internal surfaces must be ground to close limits. The present application relates in detail only to the calipering mechanism, and so far as the rest of the mechanism and machine movements which qualify the action thereof is concerned, any equivalent may be substituted.

The construction and operation of said calipering mechanism will more fully appear from the following description, taken in connection with the accompanying drawings, in which—

Fig. 6 is a fragmentary plan view, on an enlarged scale, of the work gauging device and its associated parts.

Fig. 7 is a side view of the parts shown in Fig. 6.

Fig. 8 is a detached rear view of the mechanism shown in Figs. 6 and 7.

Fig. 9 is a sectional view on the line 9—9 of Fig. 6.

Fig. 10 is a sectional view on the line 10—10 of Fig. 6.

Fig. 11 is a wiring diagram.

Like reference characters refer to like parts in the different figures.

Figure 1:
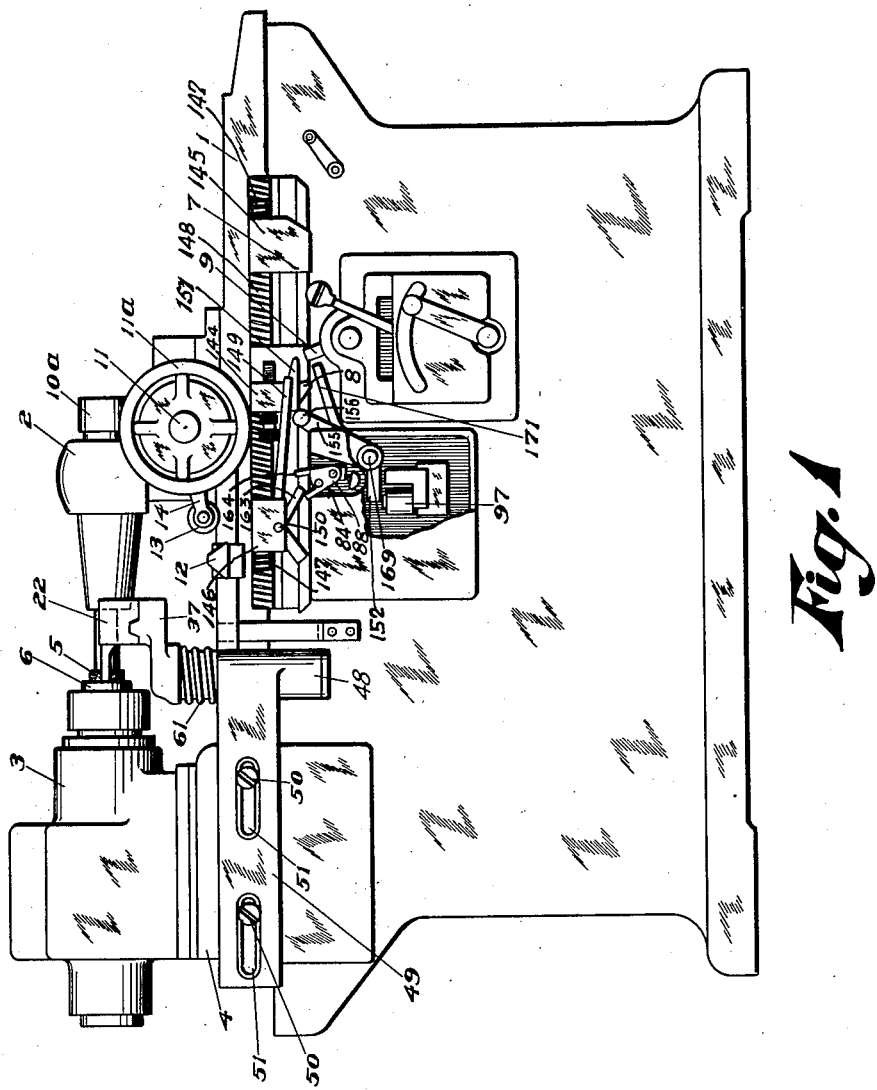
Fig. 1 is a front elevation of a grinding machine embodying the invention.
Figure 2:
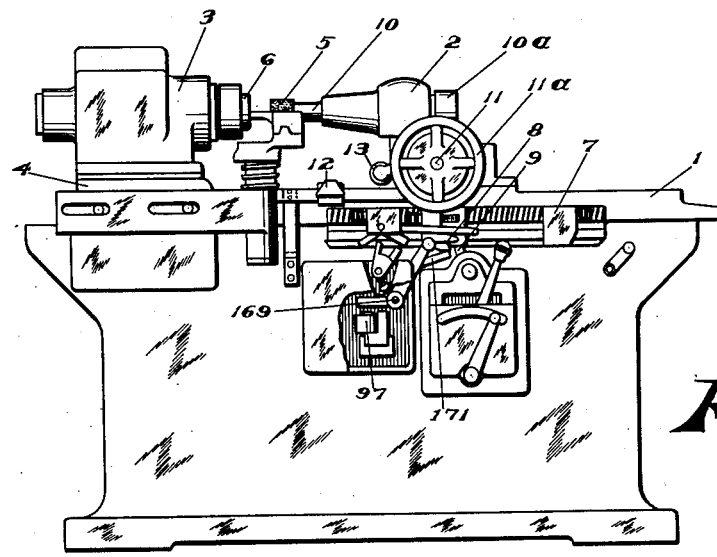
Figs. 2 and 3 are, respectively, a front elevation and a plan view, showing the wheel dressing operation.

Referring to the drawings, particularly Figs. 1 to 5 inclusive, the machine provides the usual reciprocatory table or carriage 1, which is ordinarily provided in any internal grinding machine. In such a machine, either the grinding wheel or the work to be ground may be carried on the table 1, the reciprocations of the latter being utilized in either case to produce a relative traversing movement between the grinding wheel and the work. As here shown, the table 1 supports and carries a wheel head 2 of the usual construction,—while the work which is to be operated upon is held in a work head 3, the latter being carried by a bridge 4 which spans the slideways provided by the machine frame for the back and forth movement of the table 1.

Said back and forth movement of the table 1, to cause the rotating grinding wheel 5 to make the required interior traverse of the rotating workpiece 6, may be imparted in any well known manner, as for instance, by the use of the fluid pressure controlling and reversing mechanism which forms the subject matter of United States Letters Patent No. 1,582,468 to Heald and Guild, granted April 27, 1926. Such mechanism, or its equivalent, forms no part of the present invention and a detailed description thereof is therefore unnecessary; it is sufficient to note, for the purposes of the present application, that the driving means employed for the reciprocation of the table 1, be it hydraulic drive, or gear drive, or any other type, procures the reversal of said table at each end of the latter's normal working stroke, by the use of spaced adjustable dogs 7 and 8, carried by the table and adapted to alternately engage and move an interposed member 9, whose position controls the direction of table travel.

Figure 3:
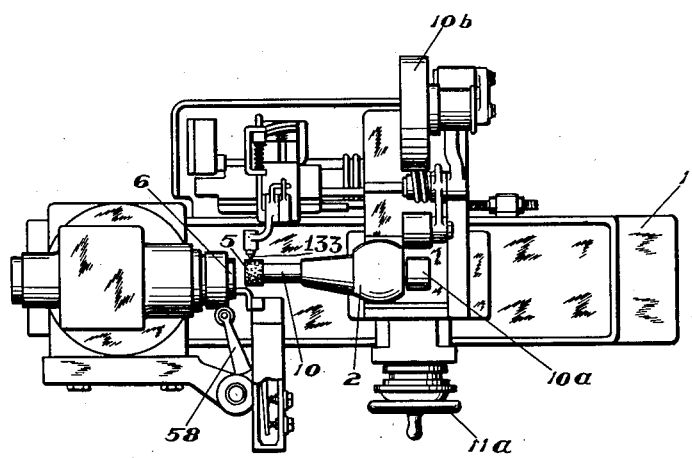
Figure 5:
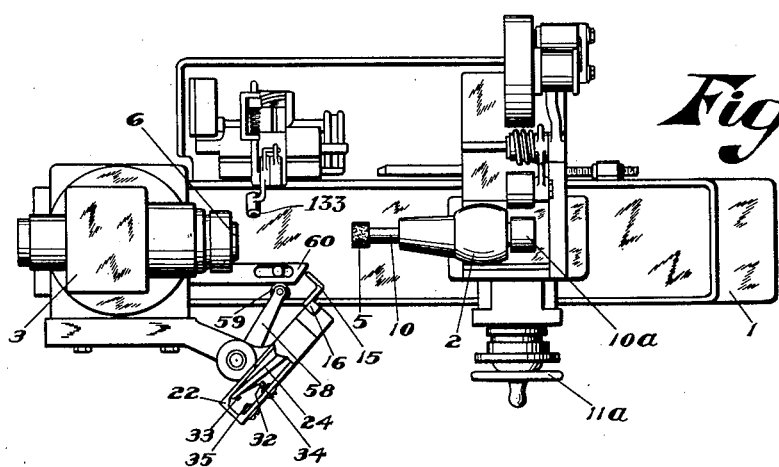

In the machine herein illustrated, the grinding wheel 5 is rotated at high speed in any suitable manner, for instance by a belt drive, Figs. 3 and 5, for the wheel spindle 10, the said wheel spindle having a pulley 10a which is connected by a belt, not shown, to a larger pulley 10b that is driven in any suitable manner. The workpiece 6 is also rotated, but at a slower speed, this rotation being imparted in any suitable manner, as by a belt drive, not shown, from a countershaft. The machine also embodies the usual instrumentalities for both manual and automatic cross feed between work and wheel, here shown as embodied in a screw shaft 11 for feeding the wheel head 2 transversely of the table 1. Said screw shaft 11 may be operated, if desired, by the usual hand wheel 11a. The automatic operation of said screw shaft 11 is effected in the usual manner, at each reciprocation of the table 1, by a fixed dog or stop 12 which is engaged by a roller 13 on the end of a pivoted arm 14; the movements of said arm are transmitted through suitable pawl and ratchet mechanism, not shown, to the screw shaft 11, thereby to obtain the automatic cross feed of the grinding wheel 5 at each reciprocation of the table.

All of the above described mechanism is old and well known in the art, and of itself forms no part of the present invention. The latter, as claimed in this particular application, comprises the work gauging or calipering mechanism and its cooperation with the other parts of the machine, the details of the calipering mechanism being best shown in the detached views of Figs. 6 and 7. Said mechanism provides a member 15, having at one end a work calipering point 16 adapted, during the operation of grinding a workpiece, to bear against the internal surface which is being ground, and to maintain its contact with said surface as the hole in the workpiece is gradually enlarged by the grinding action of the wheel. The member 15 is to all intents and purposes a lever, said member, for the movement required of it to maintain the point 16 in constant contact with the interior of the gradually enlarging hole in the workpiece, being supported by a pair of flexible U-shaped flat springs 17 and 18, which springs cross each other, as shown in Fig. 6, and are attached to two adjacent sides of a rectangular block portion 19 of member 15. At their other ends the crossed springs 17 and 18 are attached to two inner surfaces 20 and 21 of a box 22, these surfaces 20 and 21 being at right angles to each other, and the box 22 providing an opening 23 of sufficient size to permit the inward extension 15a, of member 15, to move freely about the pivotal axis which is afforded by the intersection of the planes of the U-shaped springs 17 and 18. This pivotal movement is accomplished by the flexing of these two springs, and takes place in the entire absence of lost motion, since there is no bearing or pivot pin. Consequently, any movement of the extension 15a of member 15 within the box 22, is invariably in exact accordance with the movement of calipering point 16 in maintaining contact with the surface of the gradually enlarging hole in the workpiece.

Such motion of the member 15 is adapted to be transmitted to an indicator lever 24, pivoted at 25 within the box 22, with its free end adapted to move across the graduations of a suitable scale 26. Lost motion may be eliminated at bearing 25 by a spring 25a. The connection between extension 15a and indicator lever 24 is made by a spring 27, which draws the parts together and maintains the lever 24 in contact with the end of a screw 28, said screw being adjustably threaded in extension 15a and passing at its head end through a suitably enlarged slot or hole 29 in box 22, so as to permit adjustment from the exterior of said box. By turning the screw 28, the indicator lever 24 can be made to assume any desired position relative to the member 15, and said screw 28 is maintained in any given setting, and displacement thereof prevented by any suitable friction device, such as a spring 30. With the arrangement above described, a very slight movement of the calipering point 16 is multiplied many times in being transmitted to the indicator lever 24, as will be readily understood.

In the operation of the mechanism, the calipering point 16 maintains contact with the work, the movement of member 15 for this purpose being obtained by the pressure of a spring 31, and such movement, greatly multiplied, being transmitted through the above described connections to the indicator lever 24. The multiplied movement of the latter is made use of, at predetermined points, in the grinding of each workpiece, to set in operation successively, first, the wheel dressing instrumentalities, and second, the instrumentalities for bringing about cessation of the grinding, when the workpiece reaches a predetermined and desired size. To this end, the lever 24 carries two electrical contacts, namely a contact 32 for closing an electrical circuit that controls the wheel dressing operation, and a second contact 33 for subsequently closing an electrical circuit that controls the operations involved in cessation of grinding. In the paths of these two contacts 32 and 33, the box 22 provides suitable stationary terminal contacts 34 and 35, respectively. In the movement of lever 24, the points 32 and 34 come first into contact, and subsequently the points 33 and 35 come into contact; in order to permit this succession of contacts, the point 32 which engages first, is carried by the free end of a flat spring 36 attached to lever 24, so that, by the yielding of this spring, the subsequent movement of said lever, to bring the point 33 into contact with point 35, can take place.

The box 22 which carries the member 15 and indicator lever 24 as above described, is adjustable longitudinally on a supporting bracket 37, such adjustment being effected by a screw 38, turned by a hand wheel 38a, said screw passing through a threaded lug 39 of bracket 37; after the box 22 has been adjusted as above described, it is firmly fastened in position by tightening the bolts 40, 40, which are threaded into the bottom of the box and pass through elongated slots 41, 41 of bracket 37, see Figs. 7, 9 and 10. Said bracket 37, which carries box 22, is rigidly attached to the upper end of a spindle 42, the construction being preferably as shown in Fig. 10, where the bracket 37 seats on a shoulder 43 of said spindle, or on an interposed washer 44, and is held firmly in position by a nut 45. Below the shoulder 43, the spindle 42 has a frusto-conical portion 46, the latter being received in a similarly shaped bearing recess 47 provided by an elongated spindle bearing sleeve 48, preferably formed integrally with a casting or bracket 49. The latter, as shown in Figs. 1 and 8, is secured to the machine base by bolts 50, which pass through slots 51 of said casting or bracket, to permit longitudinal adjustment of the same. At its lower end the sleeve 48 provides a ball bearing 52 for the lower end of spindle 42, the outer race of said ball bearing being pressed downwardly by a spring 53 and the inner race being attached to the spindle 42 by a nut 54. See Fig. 7. A cap 55 prevents the entrance of dirt and abrasive to the interior of said sleeve.

The above described construction provides an extremely effective mounting for the box 22, to permit it to swing into inoperative position, as shown in Fig. 5, so as to withdraw the calipering point 16 from the completed workpiece, prior to the latter's removal from the machine. This swinging movement, on account of the extended bearing surfaces 46 and 47, takes place in the absence of play or lost motion and is effected in the following manner:—A split collar 56 surrounds that portion of the bracket 37 which is secured to the spindle 42, said collar being drawn into tight engagement with said bracket by a bolt 57. Extending from said collar is an arm 58 carrying a roller 59 which, in the normal work engaging position of the calipering point 16, lies in the path of, but spaced at some distance from, a cam bar 60 attached to the table 1. In this normal work engaging position, a strong coil spring 61, surrounding the sleeve 48 and attached thereto, exerts its force against arm 58 to rotate the latter counterclockwise. Said arm is firmly attached to the bracket 37 by collar 56 and bolt 57, and thus the force of spring 61, exerted on said arm, maintains the calipering and indicating mechanism as a unit in the position shown in Figs. 3, 6 and 8, where a lug 62 on arm 58 brings up against a fixed stop 63 formed on a bracket 63a, which is attached to the casting 49. At the end of each grinding operation, when the table 1, as hereinafter described, is automatically given an extended movement to the right, as shown in Fig. 5, the cam bar 60, carried by said table, strikes roller 59 and rocks the arm 58 in a clockwise direction, against the force of spring 61, thereby swinging the entire calipering and indicating mechanism, as a unit, from the position shown in Fig. 3 into the inoperative position shown in Fig. 5, thus allowing the finished workpiece to be withdrawn and a new workpiece to be inserted in the chuck of the work head 3.

Should the operator, for any reason, desire to shift this mechanism manually into the inoperative position shown in Fig. 5, it is only necessary to loosen up on the bolt 57, thereby freeing the bracket 37 from the arm 58 and spring 61 and allowing said bracket with the attached box 22 to be swung freely out of the way. In restoring the parts to position for a resumption of the above described automatic operation, the operator swings the box and bracket until a surface 64 on the bracket engages with a lug 65 on arm 58; thereupon, the bolt 57 is again tightened to unite said arm and bracket.

In connection with the above described swinging movement of the calipering and indicating mechanism, the work calipering point 16 is automatically disposed in a position which prevents it from forcibly engaging the workpiece in the act of entering the same, and which makes it incumbent upon the operator to release the member 15, carrying said point, at the commencement of each grinding operation, by movement of a hand lever 66, as will now be described.

A rod 67 having a head 68 provides bearing portions 69 and 70 for sliding movement in bearing holes provided by opposite sides of the box 22. Between the bearing portions 69 and 70, the rod has a reduced neck 71, forming a shoulder 72 for cooperation with a downward projection 73, Fig. 7, of the extension 15a. A spring 74 encircling the rod 67 and thrusting outwardly against the head 68 thereof, draws the shoulder 72 against projection 73, and, in the inoperative position of the calipering and indicating mechanism shown in Fig. 5, this action of spring 74, being stronger than the action of spring 31, rocks the member 15 in a clockwise direction, thus to hold the calipering point 16 in an inoperative position. However, when the mechanism is swung from the position of Fig. 5 to the position of Fig. 3, the head 68 of rod 67, strikes a hardened steel stop plate 75 which is secured to the bracket 63a and this action forces the rod 67 inwardly of the box 22 and relieves the member 15 of the influence of spring 74.

This action, of itself however, does not release the calipering point 16 for engagement with the surface of the workpiece. An additional safeguard is provided by a shaft 76 which is pivotally mounted transversely of box 22 in suitable bearings provided by the opposite sides of said box, and which shaft has secured thereto the hand lever 66, hereinbefore referred to. The disposition of said hand lever is such that the weight thereof tends to turn the shaft 76 in a clockwise direction, viewed from the front of the box 22. A pin 77 extending from shaft 76 cooperates with an edgewise shoulder 78 of extension 15a in the following manner:—

When the rod 67, under the influence of spring 74, thrusts outwardly, and thereby rocks the member 15 in a clockwise direction, the pin 77 moves up in front of shoulder 78, due to the clockwise rotation of shaft 76 which is brought about by the overhang of hand lever 66. Thus said pin 77 serves to lock the member 15 in a position where the calipering point 16 will be inoperative. When subsequently the head of rod 67 engages the stop plate 75 as the calipering point moves into the work, and relieves the member 15 from the influence of spring 74, said member, 15 still remains locked by pin 77 in inoperative position, and is not released from said position until the operator rocks the hand lever 66 upwardly; thereupon, under the influence of spring 31, the calipering point 16 will move into contact with the internal surface of the workpiece and the operative connection between extension 15a and the indicator lever 24 will be established. With the next swinging movement of the parts into the inoperative position shown in Fig. 5, the spring 74 moves the member 15 in a clockwise direction and the unbalanced weight of handle 66 automatically locks said member in said position. The shaft 76 is adjustable transversely of the box 22 in order to accommodate the position of the locking pin 77 to various settings of member 15 for different sizes of work; this is accomplished by an adjusting nut 79 on bearing sleeve 79a of said shaft, said nut 79 being held in any desired setting by check nut 79b.

In the use of the mechanism as described for the quantity production of identical workpieces all ground to the exact same internal size, a sample piece or pattern is first made and accurately gauged by hand, with the use of the ordinary sizing plugs or gauges. With this sample piece at the exact required size, and still rotating in the machine, after withdrawal of the grinding wheel from engagement therewith, the box 22 carrying the calipering and indicating mechanism is swung into operative position, and the point 16 caused to make contact with the finished ground surface of the sample. Then with this contact maintained, the position of the box is adjusted so that the end of the lever 24 registers with the zero marking on scale 26, and so that the point 33 on lever 24 will just make contact with the point 35, the latter being adjustable, in and out, for this purpose. Under these conditions, the point 32, which is carried by the spring 36, on lever 24, will also be in contact with the point 34; that is to say, the proportions of the parts are such that this last mentioned contact will have been made first, and will always be made first in the swinging of lever 24, the spring 36 yielding sufficiently to allow the subsequent contact of points 33 and 35 to be made. These settings of the calipering and indicating mechanism and of the electrical contact points will be maintained throughout the subsequent run of the machine for the production of workpieces exactly like the sample or pattern.

During the normal operation on the workpiece, which is illustrated in Fig. 1, the grinding wheel 5 partakes of a longitudinal reciprocatory traverse, said traverse being given it by the reciprocations of the table 1. During said grinding operation the box 22 is in the position illustrated in said figure, and the calipering point 16 on the lever 15 is in contact with the internal surface of the gradually enlarging workpiece. This grinding operation continues uninterruptedly until, by operation of the callipering and indicating mechanism described, the contact points 32 and 34 are brought together. This, by mechanism fully described in said parent application (Patent No. 1,751,202 aforesaid), causes and amplification of the outward stroke of the table 1, carrying the parts to the position shown in Figs. 2 and 3, where the grinding wheel 5 is dressed and trued by a dressing device 133 which is lowered into the amplified path of travel of the grinding wheel coincident with the said outward movement.

As shown in the wiring diagram of Fig. 11, eletrical current may be supplied by a direct current generator 80, driven continuously, by any suitable means, not shown, from the same source of power that is used for the rotation of the grinding wheel or of the work head spindle. One terminal of this generator 80 is grounded as shown at 81, and the other is connected by a supply lead 82 to the central bar or plate 83 of a two-way switch,—the latter being designated as a whole by the numeral 84 and being disposed as shown in Fig. 1, on the front of the machine. Said switch 84 provides additional contact plates or bars 85 and 86, arranged on opposite sides of the central bar 83, and adapted to be alternately connected electrically to said central bar 83 by a connector 87 which is mounted on an oscillatory member 88. The latter is pivoted at 89, and in its full line position as shown in Fig. 11, disposes the connector 87 in contact with and across the two plates 83 and 86; in its other extreme position, the movable member 88 of switch 84 disposes the connector 87 in contact with and across the two plates 83 and 85.

The normal position of the movable switch member 88 is that indicated in Fig. 1, and under these conditions, the supply lead 82 from the generator 80 is connected to two leads 90 and 91 taken off of the plate or bar 85 of the switch 84. One of these leads, 90, runs to the coil of an electro-magnet 92, disposed on the rear side of the machine and shown in the wiring diagram of Fig. 11. The return lead 93 from the coil of electromagnet 92 is connected to the stationary contact point 34 of box 22. When the point 32, which is grounded as shown at 94, makes contact with the point 34, the electrical circuit containing the coil of electro-magnet 92 is closed and said electromagnet is energized. Associated with the electromagnet 92 is an armature member 95; energization of the magnet 92 causes attraction of this armature member resulting in slight oscillation of a spindle 96, which spindle is so connected to the dresser moving instrumentalities shown in plan view in Figs. 3 and 5 that the outward movement of the table 1 to be hereinafter described will, as a result of the oscillation of the said spindle 96, cause the dressing diamond or point 133 to be lowered into the path of the grinding wheel, thus dressing and truing the same as shown in Fig. 3. The mechanism for moving the diamond into position is not claimed in the present application, being claimed in a copending divisional application Serial No. 181,439, and hence it will not be described herein; suffice it to say that in the present embodiment of the invention the energization of the magnet 92 is a condition precedent to the energization of an electromagnet 97 which sets in operation the instrumentalities causing the table or carriage 1 to carry the grinding wheel 5 out of the workpiece for the dressing operation.

The other lead, 91, from switch bar 85 passes to the coil of the electromagnet 97, disposed on the front of the machine, as shown in Fig. 1, and the return lead 98 from the coil of electromagnet 97 passes to an insulated spring contact 99, adjacent to the electromagnet 92. When the latter, as above described, is energized by the contact of points 32 and 34, the rocking movement of armature member 95 carries a contact point 100 into engagement with the insulated contact 99, and since said contact point 100 is grounded, as shown at 101, this grounds and completes the electrical circuit through the coil of electromagnet 97 and energizes said electromagnet. Thus the energization of the two electromagnets 92 and 97, the former for moving the dressing device and the latter for amplifying the stroke of the table, as hereinafter more fully described, is brought about by the movement of contact point 32 on indicator lever 24, into engagement with the contact point 34 of box 22.

As shown in Fig. 1, the left hand table dog 8, which limits the right hand movement of table 1, is carried by a block 144 which, instead of being secured directly to the table 1, as is the case with the block 145 of dog 7, is mounted so as to be capable of sliding freely longitudinally of said table. Under normal conditions, when the table 1 is making its usual working reciprocations, to traverse the grinding wheel 5 back and forth within the workpiece, the block 144 of dog 8 is held in definite spaced relation to a block 146, which latter, the same as the block 145 of right hand dog 7, is a stationary block, adapted to maintain its predetermined setting or adjustment, longitudinally of the table 1, as given it by any suitable adjusting and holding degrees, such for instance as the hand screw nuts 147, 147 applied to both blocks 145 and 146 and engaging with a screw rack 148 on table 1.

A latch lever 149 pivoted at 150 on the block 146 constitutes the means to hold the block 144 in spaced relation to the block 146, the right hand bent-over end of said lever 149 being normally in engagement with a shoulder 151 provided by the block 144. The electromagnet 97 is located on the front of the machine as shown in Fig. 1, and when energized draws downwardly an armature 152, thus rocking upwardly a lever arm 155 carrying a roller 156, these parts being pivoted on a stud or shaft 169. The roller 156 is just below the latch lever 149 and when said lever arm 155 and roller 156 are raised in consequence of the energization of the magnet 97, the latch lever 149 is lifted, thus freeing it from the shoulder 151. This allows an amplified movement of the table 1, for the reason that the block 144 is not now rigidly attached to said table but is slidable thereon, and therefore the dog 8 will not immediately shift the reversing member 9, the resistance of said reversing member being greater than the friction of the slidable block 144 on the guideways by which it is carried on the table 1. Ultimately, however, the block 144 is engaged by the rigidly attached block 146 and thereupon the dog 8, being thus backed up, shifts the reversing member 9 and the table 1, then moves again to the left to carry the grinding wheel 5 into the rotating workpiece 6. By such return of the table the block 144 is repositioned with the latch lever 149 again behind the shoulder 151. This repositioning means is fully described in the said copending application and as it is not claimed herein, will not be further described. From the foregoing brief description of the table controlling mechanism, which is fully described in the copending application of which the present application is a division, it will be seen that energization of the electromagnet 97 results in an extended movement of the table 1 to the right, carrying the wheel 5 out of the hole in the workpiece in order that it may be dressed and trued by the dressing device which is lowered into position as already set forth, followed by subsequent resumption of the normal reciprocatory traverse between wheel and workpiece.

Repetition of the amplified dressing stroke is prevented, despite maintenance of the contacts 32 and 34 together, by the following mechanism. On the amplified outward or right hand stroke of the table 1, an outwardly and downwardly projecting bar 163, pivotally secured to the block 146 that moves in unison with the table, strikes an arm 164, Figs. 1 and 11, of movable switch member 88, thereby rocking said member from the position shown in Fig. 1 to the position shown in Fig. 11, where the connector 87 no longer makes contact with the right hand switch bar 85. This terminates the supply of current to the electromagnets 92 and 97, so that, notwithstanding the continued contact between the points 32 and 34, the respective armatures of said magnets are rendered free to move by gravity to their normal inoperative positions. Thereupon, the grinding wheel 5 having returned to its position of normal traverse in the workpiece 6, as illustrated in Fig. 1, the grinding of said workpiece is continued without further interruption for dressing despite the maintenance of the aforesaid contact by the calipering mechanism.

It should be noted that the amplified motion given to the table 1 as just described does not move it far enough to cause the cam bar 60 to contact with the roller 59, so that the box 22 and consequently the calipering lever 15 and point 16 remain undisturbed.

Figure 4:
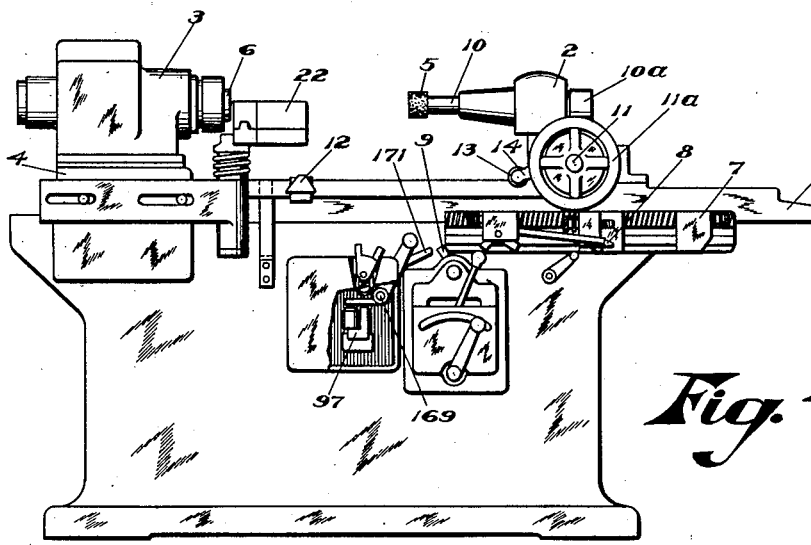
Figs. 4 and 5 are, respectively, a front elevation and a plan view, showing the positions automatically assumed by the parts at the finish of each grinding operation.

Subsequent to this dressing operation, the normal grinding traverse is resumed until, by the making of the contacts 33 and 35 under the control of the calipering mechanism, the table 1 is caused to withdraw to the extreme position of Figs. 4 and 5 thus definitely terminating the grinding operation on that particular workpiece. This extended travel of the table 1 is brought about in the following manner:—

Again referring to Fig. 11, the left hand bar or plate 86 of the switch 84 is connected by a lead or conductor 165 to an electromagnet 166. The other terminal of said electromagnet 166 is connected by a lead 167 to the contact terminal 35. Subsequent to the dressing operation briefly described, the connector 87 on the oscillatory member 88 provided by the switch 84 occupies the position shown in Fig. 11, connecting together the plates or bars 83 and 86, and thus when the terminals 33 and 35 come together the electric circuit is completed through the electromagnet 166, by reason of the fact that the terminal 33 is grounded onto the lever 24 which is uninsulated from the machine, this fact being indicated diagrammatically in the diagram of Fig. 11 at 94.

The electromagnet 166 is one of a pair of such devices mounted on the front of the machine, being directly behind the electromagnet 97 in Fig. 1. The electromagnet 166 has associated therewith an armature member 168 and a lever arm 171, both being integrally connected and being pivoted about the pivot shaft 169. The lever arm 171 may be clearly seen in Figs. 1, 2 and 4; it lies in the same vertical plane as, and normally just below, the table controlling dogs. The dog 8 is a pivotally mounted dog and when, by reason of the attraction of the armature 168 responsive to energization of the electromagnet 166, the lever arm 171 is raised, the free end of said dog, on the right hand movement of the table 1, engages with and rides upon the upwardly inclined surface of arm 171 and is thus carried clear of the reversing member 9. Thus said table 1, through the disposal of dog 8 in a wholly inoperative position, continues its movement to the right, carrying the grinding wheel 5 out of the workpiece 6, said table finally being brought to a full stop in the position of Figs. 4 and 5 by any suitable means, such as that disclosed in the aforesaid patent to Heald and Guild.

This extended travel of the table 1, as already stated, brings the cam bar 60 into contact with the roller 59 provided by the depending arm 58, thus rocking the calipering box 22 to the position shown in Fig. 5 and setting in operation the instrumentalities for locking the caliper member 15 in the inoperative position.

From the foregoing it will be seen that we have provided a very effective mechanism for controlling a dressing operation to take place during the operation on a workpiece and for causing the grinding operation to cease and determine when the workpiece reaches the desired size, the control being obtained by direct contact with the gradually enlarging hole in the workpiece. Furthermore, our invention provides a mechanism that is easily adjusted for different sizes of workpieces, and the calipering element of our mechanism is made to readily enter and leave a workpiece without disarranging the adjustments and without chipping the diamond contact point that is preferably used.

We claim,

1. In an internal grinding machine, a work calipering device, a support for said device, said support being mounted on a pivot, a work calipering arm associated with said device, means for swinging said support so as to move said arm into the hole in a workpiece, and a stop cooperating with said support to limit the movement of said arm into said hole.

2. In an internal grinding machine, a work calipering mechanism providing a calipering member having a calipering point that makes contact, during the grinding operation, with the surface of the hole in the workpiece, means for moving said calipering member to carry said point out of the hole, means set in operation by said movement for moving said point to an inoperative position, and means for locking it there.

3. In an internal grinding machine, a work calipering mechanism providing a calipering member having a calipering point adapted for contact, during the grinding operation, with the surface of the hole in the workpiece, said mechanism being movable toward and away from said hole, and means operated in response to such movements of said mechanism for maintaining said point out of contact with the workpiece during the passage of said calipering member into and out of said hole.

4. In an internal grinding machine, a work calipering mechanism providing a calipering member having a calipering point adapted for contact, during the grinding operation, with the surface of the hole in the workpiece, said mechanism being movable toward and away from said hole, locking means operated by such movements of said mechanism for holding said point in an inoperative position during the passage of said calipering member into and out of said hole, so as to prevent chipping of said point, and manually controlled means for releasing said locking means.

5. In a grinding machine, a work calipering mechanism movable into and out of operative relation to the work, a grinding wheel having a reciprocatory working traverse relative to the work, and means responsive to an increase of said traverse for procuring the movement of said calipering mechanism into inoperative position.

6. In a grinding machine, a work calipering mechanism movable into and out of operative relation to the work, a grinding wheel, means for withdrawing said wheel from said work into dressing position without effect on said work calipering mechanism, and means, responsive to a further withdrawal of said grinding wheel, for procuring the movement of said calipering mechanism into inoperative position.

7. In a grinding machine, a work calipering mechanism movable into and out of operative relation to the work, a grinding wheel having a reciprocatory working traverse relative to the work, means for increasing said traverse to subject said wheel to a dressing operation, without effect on said work calipering mechanism, and means for procuring the movement of said calipering mechanism into inoperative position on a further increase of said traverse.

8. In an internal grinding machine, a work calipering mechanism having a work calipering point mounted so as to be movable in the operative position of said mechanism, substantially radially toward and from the surface of the hole in the workpiece, said mechanism being movable to carry said point into and out of said hole, a positive stop for limiting the inward movement of said mechanism, resilient means for holding said point out of contact with the work during movement into said hole, and means acting against said resilient means to release said point upon engagement of said mechanism with said positive stop.

9. In an internal grinding machine, a work calipering mechanism providing a calipering member having a calipering point adapted to make contact, during the grinding operation, with the surface of the hole in a workpiece, means for moving said mechanism to carry said calipering point into and out of said hole, means responsive to such movements for automatically retracting said point, so as to prevent contact with said workpiece, during the movements of said calipering mechanism which carries said point into and out of said hole, and locking means for holding it there.

10. In an internal grinding machine, a work calipering mechanism providing a calipering member having a calipering point adapted to make contact, during the grinding operation, with the surface of the hole in a workpiece, means for moving said mechanism to carry said calipering point into and out of said hole, means responsive to said movement for automatically retracting said point, so as to prevent contact with said workpiece, during the movements of said calipering mechanism which carries said point into and out of said hole, means for locking said point in said retracted position, and means for freeing said point from said locking means, to permit contact with the surface of said hole, after said calipering mechanism has been moved to dispose said point within said hole.

11. In an internal grinding machine, a work calipering device, a support therefor, a movable arm provided by said device, means for moving said support to carry said arm out of the hole in a workpiece, resilient means for moving said arm relative to said device to permit the arm to be carried out of the hole without touching the mouth thereof, means for moving said support to carry the arm back into the hole, and a stop adapted to be contacted by said resilient means, whereby the means causing return movement of the support resets the resilient means, thus to permit the arm to be restored to its normal position relative to the device in order to caliper the workpiece.

12. In an internal grinding machine, a work calipering device, a support therefor, a movable arm provided by said device, means for moving said support to carry said arm into the hole in a workpiece, a stop cooperating with said support to limit the movement of said arm into said hole, means for moving said support to carry the arm out of the hole, resilient means for moving said arm relative to said device to permit the arm to be carried out of the hole without touching the mouth thereof, and a stop adapted to be contacted by said resilient means, whereby the means causing return movement of the support resets the resilient means, thus to permit the arm to be restored to its normal position relative to the device in order to caliper the workpiece.

13. In an internal grinding machine, mechanism for calipering the hole of a workpiece in said machine, said mechanism including a movable arm having a calipering point for engagement with the surface of said hole, means for moving said mechanism to carry said point into and out of said hole, and means brought into operation by such movements of said mechanism for shifting said arm relative to said mechanism, thereby to prevent engagement of said point with the mouth of said hole while said mechanism is in motion.

ROGER N. HEALD.
WALDO J. GUILD.
ALFRED P. BURNS.
GEORGE E. GARNO.